(12) United States Patent  
Willner et al.

(10) Patent No.: US 8,976,445 B1  
(45) Date of Patent: Mar. 10, 2015

(54) OPTICAL TUNABLE TAPPED-DELAY-LINES USING WAVELENGTH CONVERSION AND CHROMATIC DISPERSION BASED DELAYS

(71) Applicant: University of Southern California, Los Angeles, CA (US)

(72) Inventors: Alan E. Willner, Los Angeles, CA (US); Mohammad R. Chitgarha, Los Angeles, CA (US); Salman Khaleghi, Los Angeles, CA (US); Omer F. Yilmaz, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 13/784,524

(22) Filed: Mar. 4, 2013

Related U.S. Application Data

(60) Provisional application No. 61/606,102, filed on Mar. 2, 2012.

(51) Int. Cl.
*G02F 1/35* (2006.01)

(52) U.S. Cl.
CPC .............. *G02F 1/353* (2013.01); *G02F 1/3515* (2013.01)
USPC ................ 359/326; 385/27; 398/82; 398/161

(58) Field of Classification Search
CPC .............................. G02F 1/3515; G02F 1/353
USPC ......... 359/326–332; 385/27; 398/81, 82, 147, 398/148, 158, 161, 189, 192
See application file for complete search history.

(56) References Cited

U.S. PATENT DOCUMENTS

| 5,526,170 | A  | * | 6/1996 | Esman et al.     | 359/279 |
|-----------|----|---|--------|------------------|---------|
| 5,917,970 | A  | * | 6/1999 | Burns et al.     | 385/24  |
| 6,369,937 | B1 | * | 4/2002 | Verber et al.    | 359/328 |
| 6,879,433 | B1 | * | 4/2005 | Yamashita et al. | 359/332 |
| 7,369,600 | B2 | * | 5/2008 | Upton et al.     | 375/142 |
| 7,538,935 | B2 | * | 5/2009 | Gaeta et al.     | 359/326 |

OTHER PUBLICATIONS

Chitgarha et al., "Demonstration of Baud-Rate-Variable and Channel-Spacing Tunable Demultiplexing of 10-40-Gbaud OFDM Subcarriers using a multi-Tap Optical DFT", OSA/OFC/NFOEC, OWG3.pdf, 2011, 3 pages.

Chitgarha et al., "Bit Depth and Sample Rate Tunable Digital to Analog Converter using Conversion/Dispersion Based Delays", ECOC Technical Digest, OSA, Jul. 27, 2011, pp. 1-3.

(Continued)

*Primary Examiner* — Daniel Petkovsek
(74) *Attorney, Agent, or Firm* — Fish & Richardson P.C.

(57) ABSTRACT

Methods, systems and devices implement optical tapped delay lines. In one aspect, a device includes an optical tapped delay (TDL) including a wavelength conversion element, and a dispersive element, coupled with the wavelength conversion element, to impose a relative delay to an optical signal. The optical TDL can include a nonlinear element to combine signals in a phase coherent manner. The wavelength conversion element can include an optical nonlinear device such as a periodically poled lithium niobate (PPLN) or a highly nonlinear fiber (HNLF) with a high nonlinear coefficient and a low dispersion slope to effect four-wave mixing (FWM). The dispersive element can have a low dispersion slope, and the delays effected by the optical TDL can be tunable.

20 Claims, 7 Drawing Sheets

(56) References Cited

OTHER PUBLICATIONS

Chitgarha et al., "Demonstration of channel-spacing-tunable demultiplexing of optical orthogonal-frequency-division-multiplexed subcarriers utilizing reconfigurable all-optical discrete Fourier transform", Optics Letters, vol. 37, No. 19, Oct. 1, 2012, pp. 3975-3977.

Chitgarha et al., "Coherent correlator and equalizer using a reconfigurable all-optical tapped delay line", Optics Letters, vol. 38, No. 13, Jul. 1 2013, pp. 2271-2273.

Doerr et al., "Simple Multichannel Optical Equalizer Mitigating Intersymbol Interference for 40-Gb/s Nonreturn-To-Zero Signals", Journal of Lightwave Technology, vol. 22, No. 1, Jan. 2004, pp. 249-256.

Hauer et al., "Optically Assisted Internet Routing Using arrays of Novel Dynamically Reconfigurable FBG-Based Correlators", Journal of Lightwave Technology, vol. 21, No. 11, Nov. 2003, pp. 2765-2778.

Khaleghi et al., "80-Gbit/s DQPSK Optical Tapped-Delay-Line Equalization using Finely Tunable Delays, Phases and Amplitudes", OSA/OFC/NFOEC, OThN4.pdf, 2011, 3 pages.

Khaleghi et al., "Experimental Performance of a Continuously Tunable 40-GHz Complex Weight Optical FIR Filter using Wavelength Conversion and Chromatic Dispersion", Optical Society of America / CLEO 2011, 2 pages.

Khaleghi et al., "Experimental performance of a fully tunable complex-coefficient optical FIR filter using wavelength conversion and chromatic dispersion", Optics Letters, vol. 37, No. 16, Aug. 15, 2012, pp. 3420-3422.

Moslehi et al., "Fiber-Optic Lattice Signal Processing", Proceedings of the IEEE, vol. 72, No. 7, Jul. 1984, pp. 909-930, plus 4 sheets of figures.

Rasras et al., "A Programmable 8-bit Optical Correlator Filter for Optical Bit Pattern Recognition", IEEE Photonics Technology Letters, vol. 20, No. 9, May 1, 2008, pp. 694-696.

Yilmaz et al., "Reconfigurable and Finely Tunable Optical Tapped Delay Line to Achieve 40 Gb/s Equalization and Correlation using Conversion/Dispersion Based Delays", ECOC 2010, Sep. 19-23, 2010, 3 pages.

Yilmaz et al., "Demonstration of 28-40-Gbaud, OOK/BPSK/QPSK Data-Transparent Optical Correlation with Control/ Tunability over Time Delays, Phases and Number of Taps", OSA/OFC/NFOEC, OThN1.pdf, 2011, 3 pages.

Yilmaz et al., "True Time Delays using Conversion/Dispersion with Flat Magnitude Response for Wideband Analog RF Signals", ECOC Technical Digest, OSA, Jul. 27, 2011, 3 pages.

Yilmaz et al., "True time delays using conversion/dispersion with flat magnitude response for wideband analog RF signals", Optics Express, vol. 20, No. 8, Apr. 9, 2012, pp. 8219-8227.

Ziyadi et al., "Tunable optical correlator using an optical frequency comb and a nonlinear multiplexer", Optics Express, vol. 22, No. 1, Jan. 13, 2014, pp. 84-89.

* cited by examiner

OPTICAL TUNABLE TAPPED-DELAY-LINES USING WAVELENGTH CONVERSION AND CHROMATIC DISPERSION BASED DELAYS

CROSS REFERENCE TO RELATED APPLICATIONS

This application claims the benefit of priority from U.S. Provisional Application entitled "Optical Tunable Tapped-Delay-Lines Using Wavelength Conversion and Chromatic Dispersion Based Delays", filed Mar. 2, 2012, Application Ser. No. 61/606,102, which is hereby incorporated by reference in its entirety.

STATEMENT AS TO FEDERALLY SPONSORED RESEARCH

This invention was made with government support under contract number W911NF-10-1-0151 awarded by the Defense Advanced Research Projects Agency (DARPA), and this work was further sponsored by DARPA under N00014-05-1-0053 and by AFRL (Air Force Research Laboratory) & DARPA under FA8650-08-1-7820. The government has certain rights in the invention.

BACKGROUND

Tapped delay lines are widely used in the electronic domain to accomplish a variety of tasks (see e.g., O. Katz and D. Sadot, "A Nonlinear Electrical Equalizer with Decision Feedback for OOK Optical Communication Systems," IEEE Transactions on Communcations, vol. 56, no. 12 pp. 2002-2006 December 2008; Kil-Hoon Lee, Debesh Bhatta, Hyoungsoo Kim, Edwar Ciebara, Joy Laskar, "A 10 Gb/s Coherent Detection System with Feed-Forward Equalizers for Optical Duobinary Transmission," Proceedings of the 2009 European Microwave Integrated Circuits Conference (EuMIC), pp. 286-289, 2009; Yan Ciao, Fan Zhang, Juhao Li, Liang Zhangyuan Chen, Lixin Zhu, Li Li, Anshi Xu, "Experimental demonstration of nonlinear electrical equalizer to mitigate intra-channel nonlinearities in coherent QPSK systems," 35th European Conference on Optical Communication (ECOC), 2009; Pasandi Mohammad E. Mousa, Haghighat Javad, V. David, "Adaptive weighted channel equalizer for direct-detection optical OFDM transmission systems," LEOS Summer Topical Meeting, p 85-86, 2009). They are practical implementations of finite impulse response (FIR) filters due to their causal and stable responses.

They are practical implementations of finite impulse response (FIR) filters due to their causal and stable responses. Furthermore, linear phase response can easily be achieved by FIR filters. The filter response is tuned by selection of the number of taps (N), relative delay of each tap, and tap weights. Their excellent properties make FIR filters desirable signal processors. Compensation of transmission impairments, channel equalization, and matched filtering can all be achieved and tuned by simply changing the number (N), the delay ($T_1, T_7, \ldots$), and the weight ($\alpha_0, \alpha_1, \alpha_2, \ldots$) of each tap as shown in FIG. 1 in the implementation 100 of an FIR filter using tapped delay lines (TDLs). In this manner communication and signal processing systems utilize tapped delay lines for signal and data processing and channel impairment mitigation in order to operate with maximum efficiency.

For a given input x(t), the output y(t), the frequency response of the TDL will be given by the corresponding transfer function which enables to design finite impulse response (FIR) filters by changing the number of taps, delays, and weights:

$$H(e^{jw}) = \frac{Y(e^{jw})}{X(e^{jw})} = \alpha_0 + \alpha_1 e^{jwT_1} + \alpha_2 e^{jwT_2} + \ldots + \alpha_N e^{jwT_N}$$

Traditionally, optical TDLs have mainly suffered from a difficulty in implementation and a lack of adjustability and scalability (see e.g., Sege Doucet, Sophie LaRochelle, Morin, "Reconfigurable Dispersion Equalizer Based on Phase-Apodized Fiber Bragg Gratings", *Lightwave Technology, Journal of*, vol. 27, no. 16, pp. 2899-2908, 2008; K. Hasebe, T. Sakaguchi, Y. Mada, F. Koyama, Zhao Xiaoxue, C. J. Chang-Hasnain, "Bandwidth Enhancement of Directly Modulated DFB Lasers and EML Lasers using Optical Equalizers," *IEEE Lasers and Electro-Optics Society, Proceedings of*, LEOS 2008). Several methods have been demonstrated to realize tapped delay lines for high speed signal processing at microwave frequencies (see e.g., Hoang Manh Nguyen, K. Igarashi, K. Katoh, K. Kikuchi, "Bandwidth- and wavelength-tunable comb filter using PLC-based optical transversal filter," *Conference on Lasers and Electro-Optics (CLEO)*, 2-4 Jun. 2009, Baltimore, Md., USA; Jackson, K. P., Newton, S. A., Moslehi, B., Tur, M., Cutler, C. C., Goodman, J. W., Shaw, H. J., "Optical Fiber Delay-Line Signal Processing," *Microwave Theory and Techniques, IEEE Transactions on*, vol. 33, no. 3, pp. 193-210, March 1985; Jianping Yao, "Microwave Photonics," *Lightwave Technology, Journal of*, no. 3, pp. 314-335, 2009). These methods involve both electrical and optical tapped delay lines to realize filters for both coherent and incoherent systems.

SUMMARY

Tapped delay lines (TDLs) are the fundamental building blocks for many of the basic functions that communication and signal processing systems rely on. By altering the number of taps, the weight of each tap, and the delay of each tap, a TDL can be configured to provide a variety of important system functions including: (i) finite impulse response (FIR) filtering and matched filtering, (ii) correlation and convolution, (iii) synthesis of arbitrary waveforms, (iv) analog to digital conversion, (v) signal processing at the line rate, (vi) signal shaping, (vii) equalization to correct for data degradations, and (viii) discrete Fourier transform. Traditionally these TDLs have been implemented electronically, providing these key communication functions in the RF domain (see e.g., G. Katz and D, Sadot, "A Nonlinear Electrical Equalizer with Decision Feedback for OOK Optical Communication Systems," IEEE Transactions on Communcations, vol. 56, no. 12 pp. 2002-2006 December 2008; Kil-Hoon Lee, Debesh Bhatta, Hyoungsoo Kim, Edwar Gebara, Joy Laskar, "A 10 Gb/s Coherent Detection System with Feed-Forward Equalizers for Optical Duobinary Transmission," Proceedings of the 2009 European Microwave Integrated Circuits Conference (EuMIC), pp. 286-289, 2009; Yan Gao, Fan Zhang, Juhao Liang Zhangyuan Chen, Lixin Zhu, Li Li, Anshi Xu, "Experimental demonstration of nonlinear electrical equalizer to mitigate intra-channel nonlinearities in coherent QPSK systems," 35th European Conference on Optical Communication (ECOC), 2009; Pasandi Mohammad E. Mousa, Haghighat Javad, Plant V. David, "Adaptive weighted channel equalizer for direct-detection optical OFDM transmission systems," LEOS Summer Topical Meeting, p 85-86, 2009). A desirable objective is to mirror these basic building blocks into the optical domain, such that optical communication systems can take advantage of the same advanced features that have allowed RF systems to grow and flourish.

In general, one innovative aspect of the subject matter described in this specification can be embodied as a device that includes an optical tapped delay line (TDL) including a wavelength conversion element, and a dispersive element, coupled with the wavelength conversion element, to impose a relative delay to an optical signal. The wavelength conversion element can use second order and third order nonlinear susceptibility, and the optical TDL can include a nonlinear element to combine signals in a phase coherent manner.

The wavelength conversion element can include two or more optical nonlinear devices, which can include a periodically polled niobate (PPLN) waveguide to effect cascaded sum frequency generation followed by difference frequency generation (cSFG-DFG), or a highly nonlinear fiber (HNLF) with a high nonlinear coefficient and a low dispersion slope to effect four-wave mixing (FWM). The dispersive element can have a low dispersion slope, and the delays effected by the optical TDL can be tunable. The nonlinear optical element can also include integrated waveguides exploiting highly nonlinear materials. The nonlinear medium can include PPLN devices that produce sum frequency generation, difference frequency generation, second harmonic generation, and the cascade of such mixings.

The optical TDL can work for phase, intensity and polarization based modulation formats. The device can include one or more laser pumps to effect phase coherent multiplexing in a nonlinear device. The optical TDL can include a conversion stage of a conversion/dispersion delay line, the conversion stage comprising multiple pumps. The optical TDL can include a phase coherent multiplexing stage. The optical TDL can includes taps, and weights of the optical TDL taps can be complex numbers for amplitude and phase, The device can include a spatial light modulator (SLM), where phases are applied in the SLM. Moreover, phases of the pumps can be controlled by fine tuning of pump wavelengths.

These and other implementations can include one or more of the following features. In some implementations, the optical TDL can work for both phase and intensity based modulation formats. The device can include one or more laser pumps to effect phase coherent multiplexing. Moreover, the optical TDL can include a conversion stage of a conversion/dispersion delay line, the conversion stage including multiple pumps.

The methods, systems and devices can be implemented in various applications of tunable equalization, correlation, optical discrete Fourier transforms, and digital-to-analog conversion. A TDL can be configured to provide a variety of important system functions including: (i) finite impulse response (FIR) filtering and matched filtering, (ii) convolution and correlation, (iii) synthesis of arbitrary waveforms, (iv) analog to digital conversion, (v) signal processing at the line rate, (vi) signal shaping, (vii) equalization to correct for data degradations, and (viii) discrete Fourier transform. Furthermore, with a suitable choice of channel wavelength, many optical channels can be processed simultaneously in a single element.

Particular embodiments of the subject matter described in this specification can be implemented so as to realize one or more of the following potential advantages. Current optical systems are limited to using TDLs in the electronic domain, as part of a digital receiver for example. This presents a critical bottle neck as the complexity of optical systems grows driven by the need for greater bandwidth and higher data-rates. The forthcoming IEEE 100-G-bills Ethernet Standard, 802.3ba (see IEEE P802.3ba 40 Gb/s and 100 Gb/s Ethernet Task Force http://www.ieee802.org/3/ba/), provides greater bandwidth, higher data rates, and a mixture of modulation formats, requiring a solution that is capable of handling the increased bandwidth and is adaptable to mixture of data-rates and modulation formats. An optical TDL has the potential to alleviate this bottleneck by taking advantage of the enormous increase in bandwidth, wide dynamic range, and dramatic increase in speed that optics has to offer. Where an electronic TDL would require de-multiplexing the line-rate to a lower speed, processing of each low speed tributary independently, and then multiplexing back to the transmission line-rate, an optical solution can provide a dramatic increase by processing the channel at the line rate. Furthermore, with a suitable choice of channel wavelengths and two polarizations, many optical channels can be processed simultaneously in a single element.

Most high speed electrical tapped delay lines, either use a photodetector followed by RF delays and couplers to realize the filter, or employ optical splitters, optical delay lines and attenuators to realize the taps and use a detector as the combining element. The former is limited by the electronic sampling frequency, on the order of 1 GHz, and in the latter the delays are not easily tunable and the minimum tap delay is limited by the coherence time of the signal. Electronic signal processing also suffers from electromagnetic interference (see e.g., Minasian, R. A., "Photonic signal processing of microwave signals," *Microwave Theory and Techniques, IEEE Transactions on*, vol. 54, no. 2, pp. 832-846, 2006). Different optical architectures for TDLs have been proposed, in which the tapping element can be optical couplers, highly dispersive fiber, fiber Bragg gratings (FBG), arrayed waveguide gratings (AWG), Mach-Zehnder lattices, and multi mode dispersion compensation fiber (see e.g., Kwang-Hyun Lee, Woo-Young Choi, S. Choi, K. Oh, "A novel tunable fiber-optic microwave filter using multimode DCF," *Photonics Technology Letters, IEEE*, vol. 15, no. 7, pp. 969-971, 2003). Most of these filters are designed to work in the incoherent regime. In the generic scheme based on optical splitter/fiber optic delay/combiner, the tap delay is limited by the coherence time of the optical signal, and the filter is minimally tunable.

Another popular photonic-based microwave filter tapped delay line scheme, modulates an array of lasers to create copies of the signal (taps) and uses a highly dispersive fiber to create the delays. The number of taps depends on the number of laser in the array. Alternatively, AWGs followed by fiber optic delay lines, and also FBGs have been utilized instead of highly dispersive fiber to realize the delay between different wavelengths. FBG-based delays, the delays can be varied by changing the spacing between gratings and tap weights can be manipulated by varying the reflectivity of gratings. Yet, fast reconfiguration and fine tuning of the filter is not achieved easily since the gratings are relatively fixed wavelength and reflectivity.

In almost all of the mentioned dispersion based delay techniques, in order to create copies of the signal at multiple wavelengths it is assumed that an "RF signal" simultaneously modulates various pumps. This would be a limitation for optical signal processing at the line rate. Our alternative approach to realize optical delays which allows for signal processing on the optical signals is based on conversion/dispersion tunable delays, as shown in conceptual block diagram 200 in FIG. 2. This technique consists of the following blocks: (1) Wavelength Conversion—as shown in FIG. 2, the original signal is wavelength converted using for example cascaded sum frequency generation followed by difference frequency generation in PPLN devices or four-wave mixing (FWM) in a highly nonlinear fiber (HNLF). HNLF with high nonlinear coefficient and low dispersion slope will be required to achieve efficient FWM, (2) Delay via Dispersion—A highly dispersive element is used to impose a relative delay corresponding to each wavelength. To limit the amount of intra-channel dispersion (i.e. dispersion over the bandwidth of the converted signal) a dispersive element with low dispersion slope is required.

We have achieved optical tunable delays of up to 3.6 μs enabling a variety of applications using this conversion/dispersion technique for 100 Gb/s DQPSK signals (see e.g., S. R. Nuccio, O. F, Yilmaz, X. Wang, H. Huang, J. Wang, X. Wu, and A. E. Willner, "Higher-Order Dispersion Compensation to Enable a 3.6-μs Wavelength Transparent Delay of a 100-Gb/s DQPSK Signal," Optics Letters, vol. 35, pp. 2985-2987, 2010). Delays of a variety of modulation formats and data rates ranging from 10 Gbit/s OOK to 100 Gbit/s DQPSK have been reported using the conversion/dispersion technique. These reports include, hut not limited to, 1 μs delay for 10 Gbit/s OOK signals using Silicon waveguides for wavelength conversion (see e.g., Yitang Dai, Xianpei Chen, Yoshitomo Okawachi, Amy C. Turner-Foster, Mark A. Foster, Michal Lipson, Alexander L. Gaeta, and Chris Xu, "1 μs tunable delay using parametric mixing and optical phase conjugation in Si waveguides," Opt. Express 17, pp. 7004-7010, 2009), and 1.56 μs delay for 40 Gbit/s OOK and DPSK signal using parametric amplification in fibers for wavelength conversion (see e.g., Evgeny Myslivets, Nikola Alic, Slaven Moro, Bill P. P. Kuo, R. M. Jopson, C. J. McKinstrie, M. Karlsson, and Stojan Radie, "1.56-μs continuously tunable parametric delay line for a 40-Gb/s signal," Opt. Express 17, pp. 11958-11964, 2009).

Our all-optical design provides full flexibility of the TDLs since it relies on the optical signal processing methods. The delays are not discrete and therefore tunable. This enables support for any data rate and for design of any achievable FIR filter. Furthermore, the nonlinear processes used are phase transparent and therefore our TDL structure works for both phase and intensity based modulation formats. We have introduced the novel concept of phase coherent multiplexing by re-using the pump lasers. This enables coherent optical multiplexing such that the electrical fields are can be vector summed. Additionally, our design is not limited in the number of taps since there is not a physical limitation. The number of taps can be increased as easily as using a new laser pump that will be used for generation of new signal copies.

In comparison to traditional conversion/dispersion delays, this method of optical tapped delay line generation has some novelty. Typically, conversion/dispersion only operates on a single optical channel; however, for a tapped delay line several optical copies need to be delayed simultaneously. By allowing for multiple pumps in the conversion stage of a conversion/dispersion delay line, this multi-tap operation can be achieved. In this manner, the first stage of a conversion/dispersion system can accomplish both the multicasting (tap number and weight) and the wavelength selection (tap delay) for an optical tapped delay line, Furthermore, since the delays required for an optical tapped delay line are on the order of a bit-time or less, the amount of delay required is relatively small. For a 100 Gbit/s channel, this translates into a maximum delay of ~10 ps. This greatly reduces the requirements on the dispersive element and on the need for intra-channel dispersion compensation. As the data-rate of the optical channel is increased, the required delay value further decreases as the bit-time is decreased. This makes conversion/dispersion an excellent choice for high-speed optical tapped delay lines.

The concept and the principles of operation have been demonstrated experimentally and have been shown for use in applications of tunable equalization, correlation, optical Fourier transforms, and digital-to-analog conversion. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
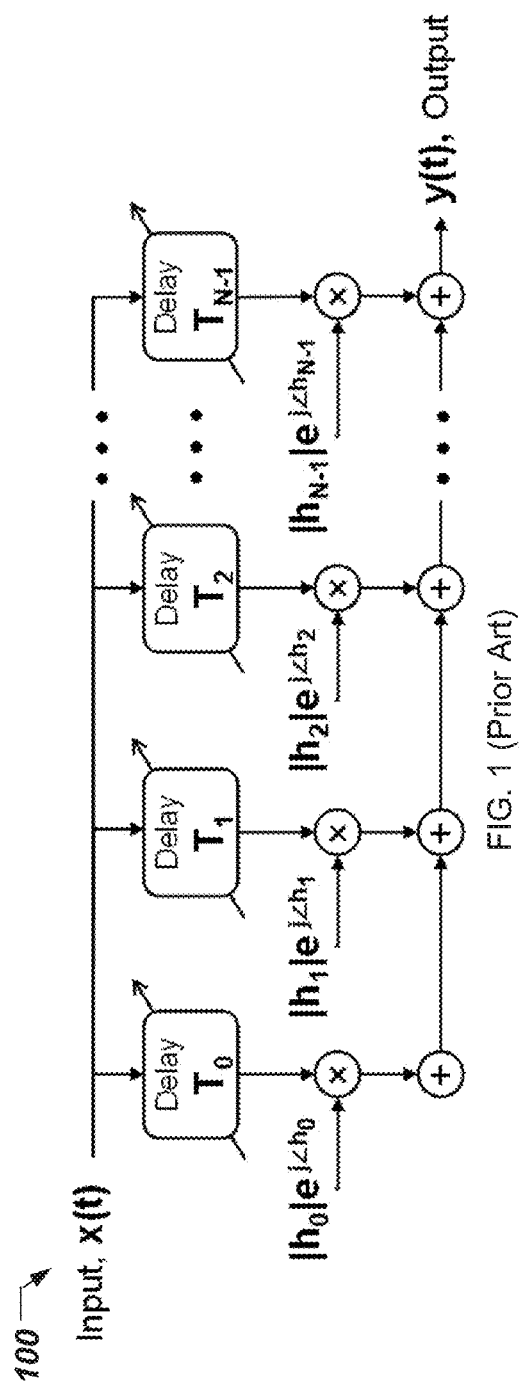
FIG. 1 shows an implementation of a tunable FIR filter using tapped delay neo.
Figure 2:
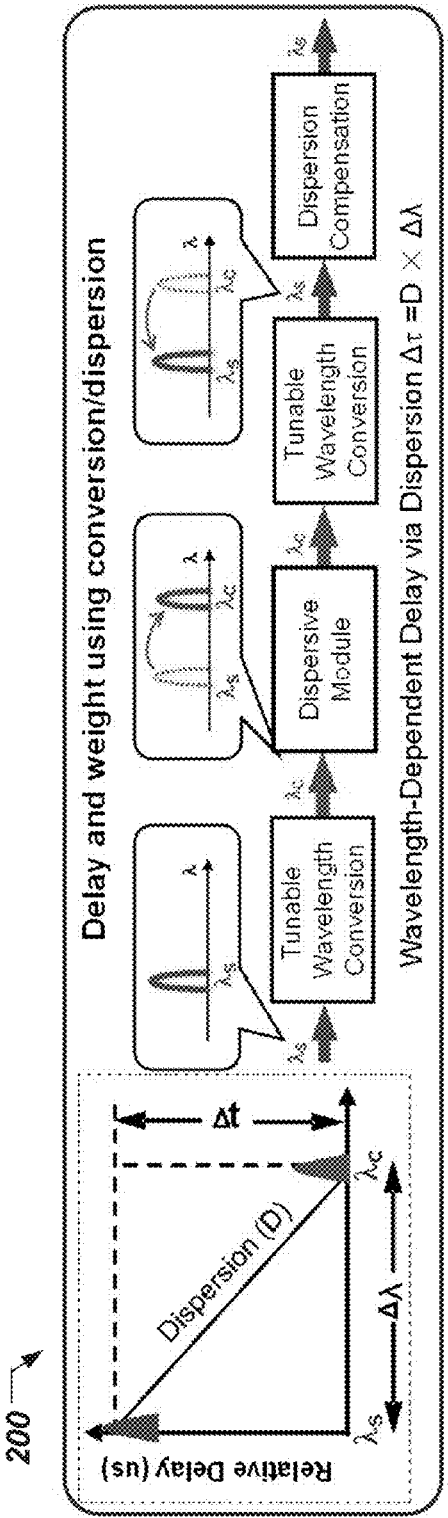
FIG. 2 shows conversion/dispersion based optical delay.

The following description addresses implementations involving 80-Gbit/s DOPSK Optical Tapped-Delay-Line Equalization using Finely Tunable Delays, Phases and Amplitudes. In these implementations, we experimentally demonstrate a tunable and reconfigurable optical tapped delay line using conversion dispersion based delays with optical multicasting and multiplexing. After equalization, at BER of $10^{-9}$ and 3 dB power penalty, dispersion tolerance is improved by >50% and 200% for 80-Gbit/s RZ-DOPSK and 40-Gbit/s RZ-DPSK signals, respectively.

The field of high-data-rate signal processing relies heavily on the use of tapped delay lines (TDLs) as a powerful tool (see e.g., J. G. Proakis, Digital Communications, McGraw-Hill (2000); J. H. Winters, R. D. Gitlin, IEEE Trans. on Comm., vol. 38, pp. 1439-1453, (1990); J. Yao, J. of Lightwave Technol., vol. 27, n. 3, pp. 314-335, (2009); T. Mengual, B. Vidal, J. Marti., Proc. MWP/APMP '08, pp. 106-109 (2008)). For digital signals, the TDL can dramatically "equalize" a distorted data stream and significantly reduce the system penalties. Key parameters of a TDL are the number of power taps (N), each with a different weight ($\alpha_i$) and with a different time delay ($T_i$). These time delays can vary from fractions of a bit time to multiple bit times in order to optimally redistribute the energy of the data in the time domain.

Optical implementations of a TDL might be quite desirable for performing the equalization function on a high-speed data stream. Moreover, high-bandwidth optical subsystems might be a good match at high speeds since data flows through the TDL module without the need to actively operate/switch on each bit individually. For optical TDLs, critical issues include the following abilities: (a) finely tune the relative delays since fractions of a bit time at 10's of Gbaud can easily be on the order of a few ps, (b) accommodate different modulation data formats (i.e., on-off keying, OOK, and phase-shift-keying, PSK), and (c) enable variable bit rates for different strengths of FEC as well as heterogeneous traffic.

Previous results for optical equalizers that use photonic lightwave circuits (PLC) include equalization of 40 Gb/s non-return-to-zero (NRZ) OOK signals (see e.g., C. R. Doerr et. al., J. Lightwave Technol., vol. 22, pp. 249-256, (2004)), 107 Gb/s ETDM signals (see e.g., K. Schuh, B. Junginger, E. Lach, G. Veith, J. Lutz, M, Moller, Proc. OFC '07, OWE2 (2007)), and phase-shift keying signals (see e.g., A. H. Gnauck et. al., Proc. OFC '07, OThN4 (2007)). However, these results did not include a method that allowed for tuning the delays and bit rates. Recently, a technique was shown that demonstrated fine tunability and reconfigurability in an optical TDL for a 50-Gbit/s OOK signal and that electronically combined the optically delayed copies (see e.g., O.Yihnaz, S. Khaleghi, N. Ahmed, I. M. Fazal, A. E. Winner, Proc. ECOC '10, Mo.2.A.2 (2010)). Given the importance of phase encoding of data and higher-order modulation formats, a laudable goal would be to achieve the highly functional optical TDL for differential-quadrature PSK (DQPSK) which would require complex phase encoding. Moreover, combining the different delayed copies in the optical domain could enable higher performance and functionality.

In this paper, we demonstrate 80-Gbit/s DQPSK optical tapped-delay-line equalization using finely tunable delay, phase and amplitude. Using this technique, we observed >200% improvement in dispersion tolerance for 40 Gbit/s RZ-DPSK and >50% improvement for 80 Gb/s RZ-DQPSK at ~3 dB power penalty.

Figure 3:
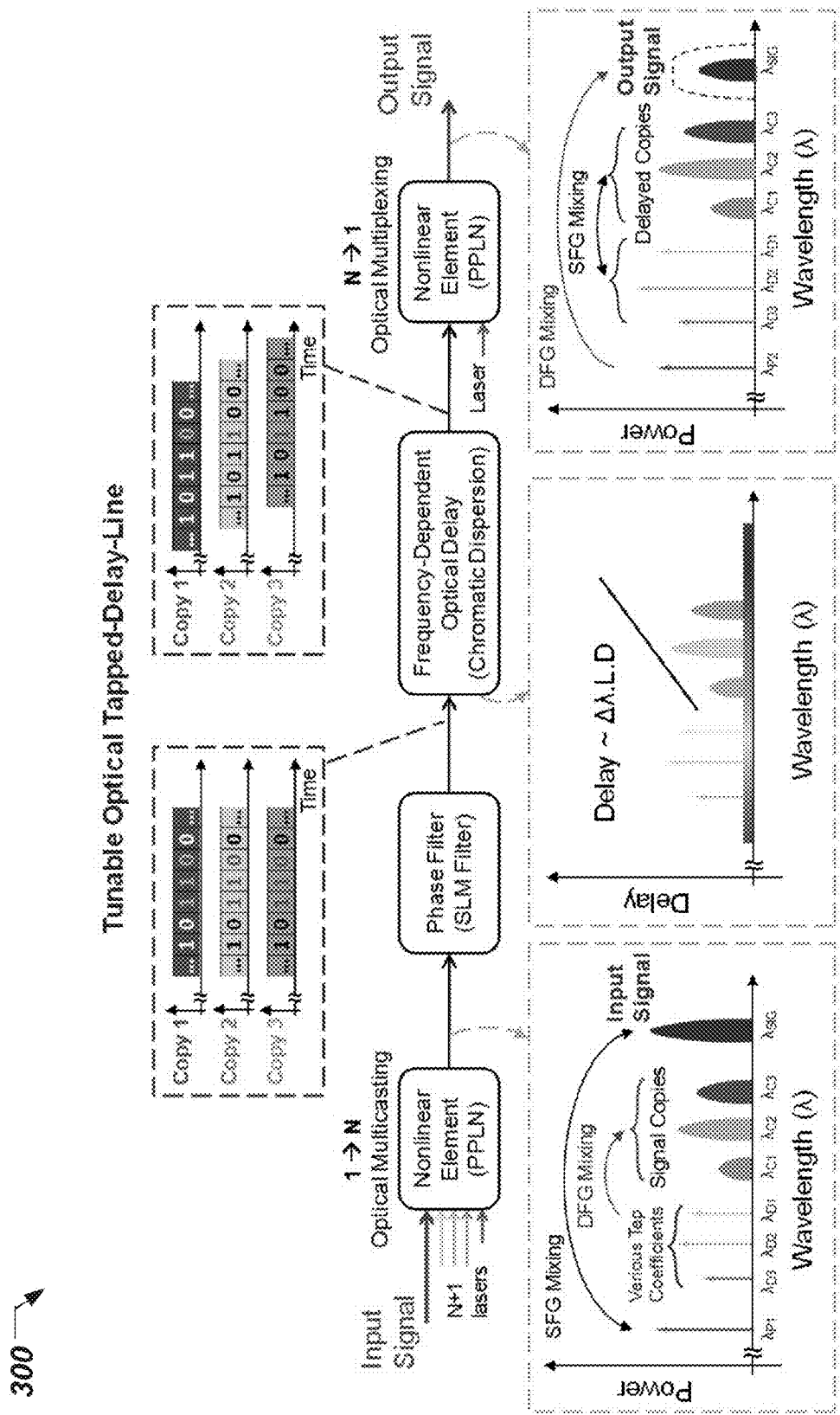
FIG. 3 shows a conceptual block diagram of tunable optical tapped delay line implementation using conversion/dispersion delays.

A conceptual block diagram 300 of the tunable optical TDL with optical multiplexing is shown in FIG. 3. An optical input signal at $\lambda_{SIG}$ is multicast to several copies at different wavelengths ($\lambda_{C1-3}$) using a periodically-polled niobate (PPLN) waveguide. The multicast copies are generated by the cascaded $\chi^{(2)}{::}\chi^{(2)}$ processes of sum frequency generation (SFG) followed by the difference frequency generation (DFG) in a PPLN waveguide using the dummy pumps ($\lambda_{D1-3}$). The multicast signal copies are then sent through a spool of dispersion compensating fiber (DCF) to induce a small amount of wavelength dependent relative delay (T~DL×Δλ) between the multicast signals. Therefore, the number of taps, tap-delays, and tap-weight-magnitudes are directly controlled by the dummy pumps.

In order to have control of the tap-phases (to realize complex valued weights), the relative phases of the multicast copies with their corresponding dummy pumps need to be controlled before multiplexing. This can be achieved by an in line phase/amplitude programmable filter, or by simply adding a fine offset to the pump wavelengths. Due to the dispersion, this small wavelength offset will result in a negligible change in the relative delay between the signal copies but induces phase difference between each copy and its dummy pump. This can be used to apply the tap phases prior to the optical multiplexing stage in another PPLN waveguide without the need for a spatial light modulator (SLM). Coherent multiplexing is achieved by keeping the dummy pumps from the first PPLN output ($\lambda_{D1-3}$) and using them as the SFG pumps to mix with their corresponding signal copies in the multiplexing stage. A pump ($\lambda_{P2}$) is introduced to generate the output multiplexed signal via the DFG process in the PPLN waveguide. Therefore, the multiplexed output is a signal equalized according to the tap weights in this process.

Figure 4A:
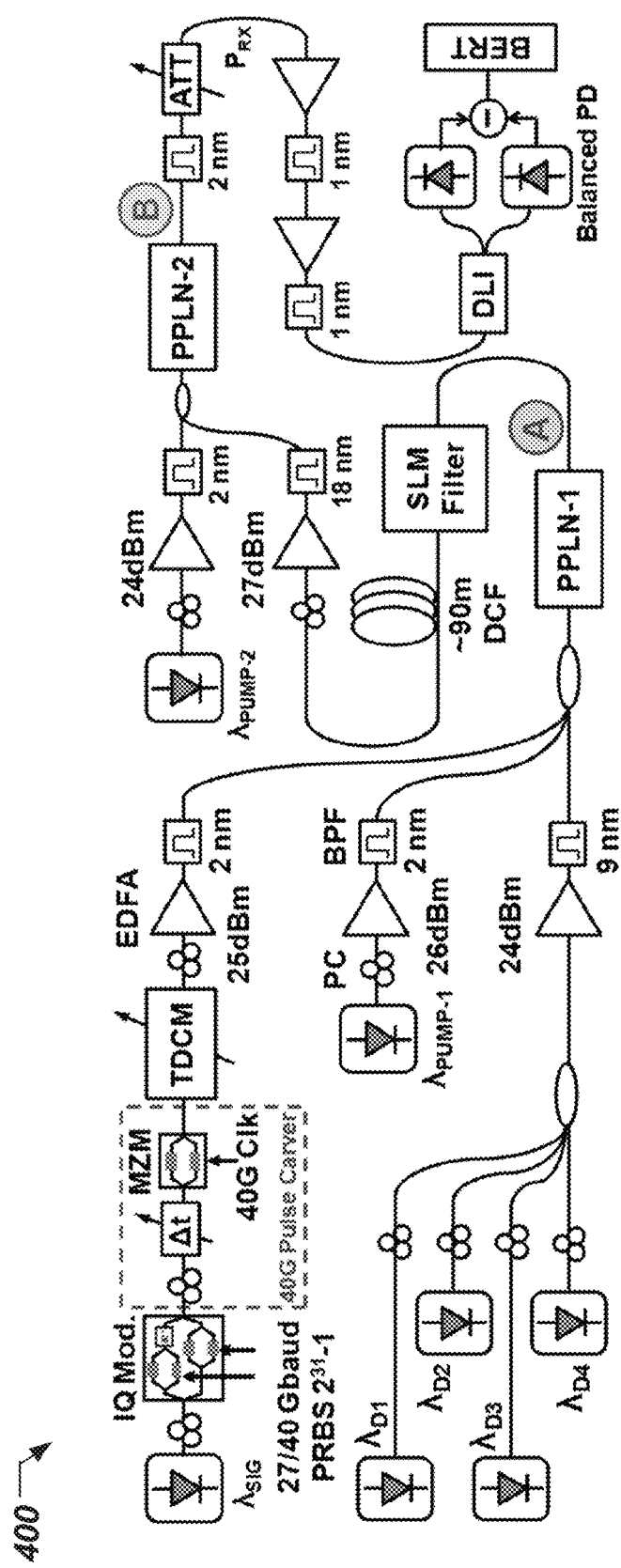
FIG. 4A shows an experimental setup for a tunable optical tapped delay line using conversion/dispersion delays.

FIG. 4A shows an experimental setup 400 for a tunable optical tapped delay line using conversion/dispersion delays. In the experimental setup for the equalizer, a nested Mach-Zehnder modulator is used to generate the input 40-Gbit/s RZ-DPSK data (pseudo-random bit sequence (PRBS) $2^{31}{-}1$) and the 80-Gbit/s RZ-DQPSK data (PRBS $2^{31}{-}1$) at ~1540.7 nm. The signal is switched to 27-Gbit/s NRZ-DPSK for additional experiments. Full-rate pulse carving is used. A tunable dispersion compensation module (TDCM) is employed to emulate dispersion on the input signal. The input signal is amplified, filtered and sent to a 4-cm PPLN waveguide (PPLN-1) along with an amplified pump laser at ~1560.75 nm.

Figure 4B:
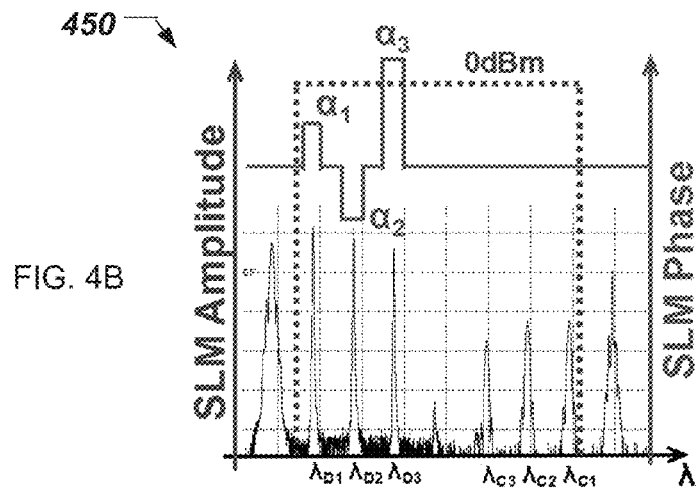
FIG. 4B shows Spatial Light Modulator (SLM) filter amplitude and phase profile for applying phases on pumps.

Four CW pump lasers ($\lambda_{D1-4}$) are coupled together, amplified and launched to the PPLN waveguide. The quasi-phase matching (QPM) wavelength of the waveguide is set to ~1550.7 nm by temperature tuning. The signal copies at corresponding wavelengths ($\lambda_{C1-4}$) are generated by the cascaded SFG-DFG processes in the waveguide. The output of the PPLN-1 is sent to a liquid crystal on silicon based amplitude/phase programmable filter (the SLM) that is used to filter the dummy pump lasers and the generated signal copies, and to control the phases of the pump laser prior to the second wavelength conversion stage, as shown in chart 450 in FIG. 4B.

Instead of using the SLM, the phases of the pumps are also controlled by fine tuning of the pump wavelength (~3°/pm). The filtered pumps and the signals are then sent through a ~90-m DCF in order to induce the relative delay. The pump lasers and the signal copies are then amplified and sent to a 5-cm PPLN waveguide (PPLN-2) with QPM ~1550.7 nm (almost similar to PPLN-1). The pairs of pumps and signal copies that are symmetric to the QPM wavelength generate the phase coherent SFG signal based on the phases and the amplitudes of the pumps and the signal copies. A pump laser at ~1560.75 nm is used for generation of the multiplexed signal at ~1540.7 nm. The multiplexed signal is then filtered and sent to a preamplified receiver for bit-error-rate (BER) measurements. As shown, the experimental setup 400 in FIG. 4A includes a Polarization Controller (PC), a Bandpass Filter (BPF), an Attenuator (ATT), a Delay Line Interferometer (DLI), and a Bit Error Rate Tester (BERT).

Figure 5A:
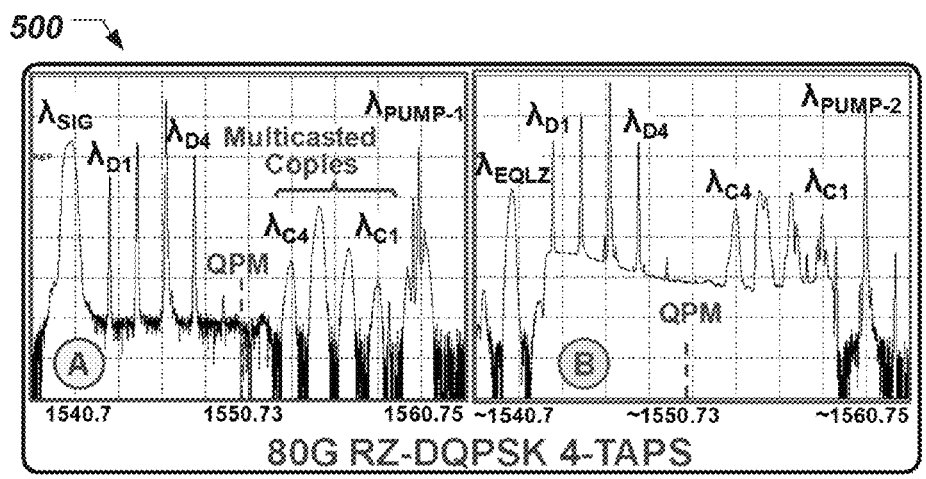
FIGS. 5A and 5B show experimental spectra for different conditions of operation for a tapped-delay-line equalizer, showing tunability to different bit rates and modulation formats.
Figure 5B:
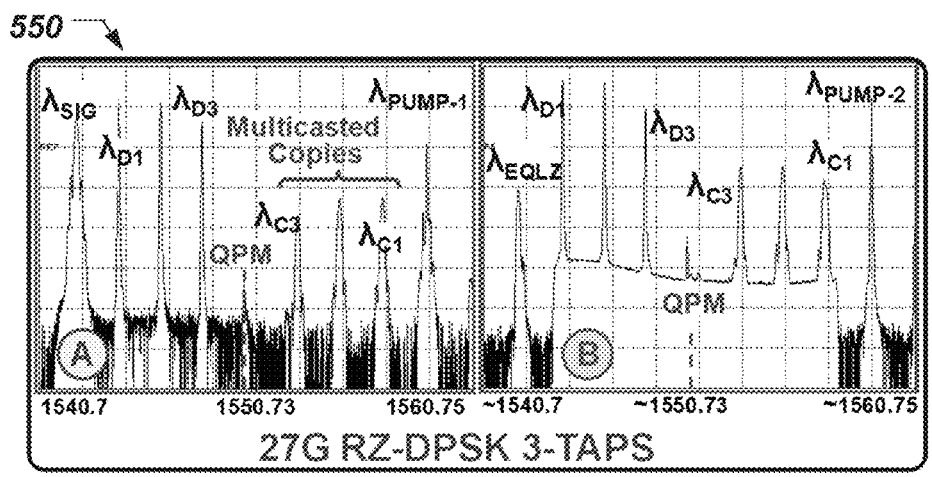

The performance of the equalizer is tested by emulating dispersion using the TDCM. FIGS. 5A and 5B show the spectra for the two stages of wavelength conversion (PPLN-1 and PPLN-2) of the optical tapped equalizer for equalization of 120 ps/nm dispersion emulated by the TDCM. FIG. 5A shows the spectra 500 for four-tap operation on a 40-Gbaud/s signal. The wavelength separation, Δλ, between the signal copies is set to ~1.6 nm, which corresponds to a ~12.5 ps. Therefore, $T_s/2$ tap-delays are achieved for the equalizer, where $T_s$ is the symbol time. In FIG. 5B, the data 550 is switched to 27-Gbit/s DPSK. Thus, in order to achieve the half bit tap delays (~18.8 ps), Δλ is changed to ~2.4 nm.

Figure 6A:
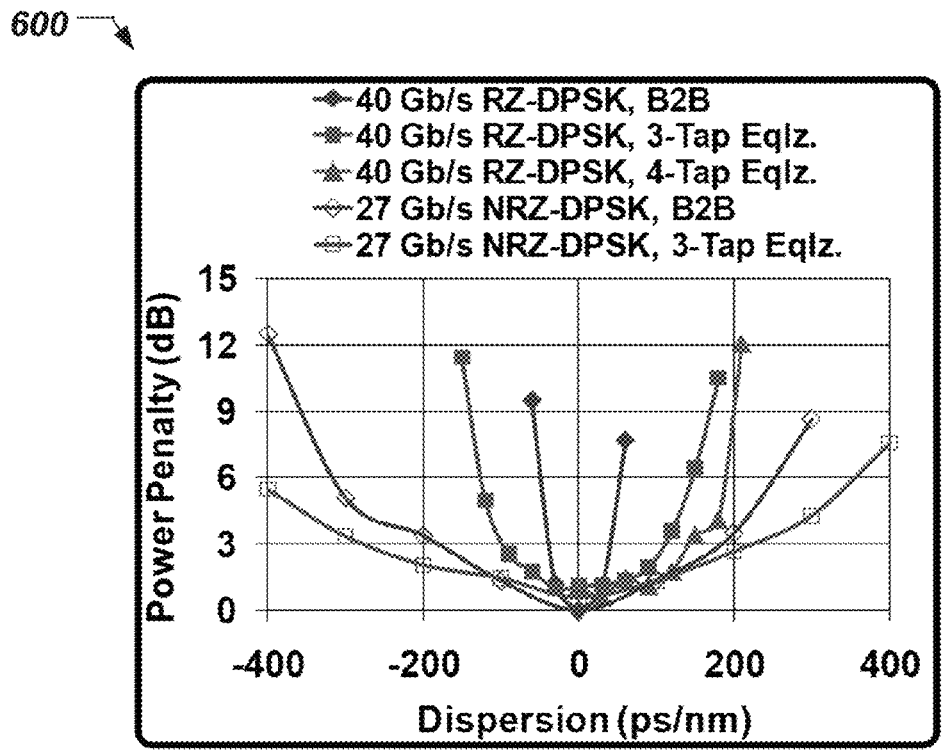
FIG. 6A shows receiver sensitivity penalties at $10^{-9}$ bit-error-rate (BER) for equalization applications.
Figure 6B:
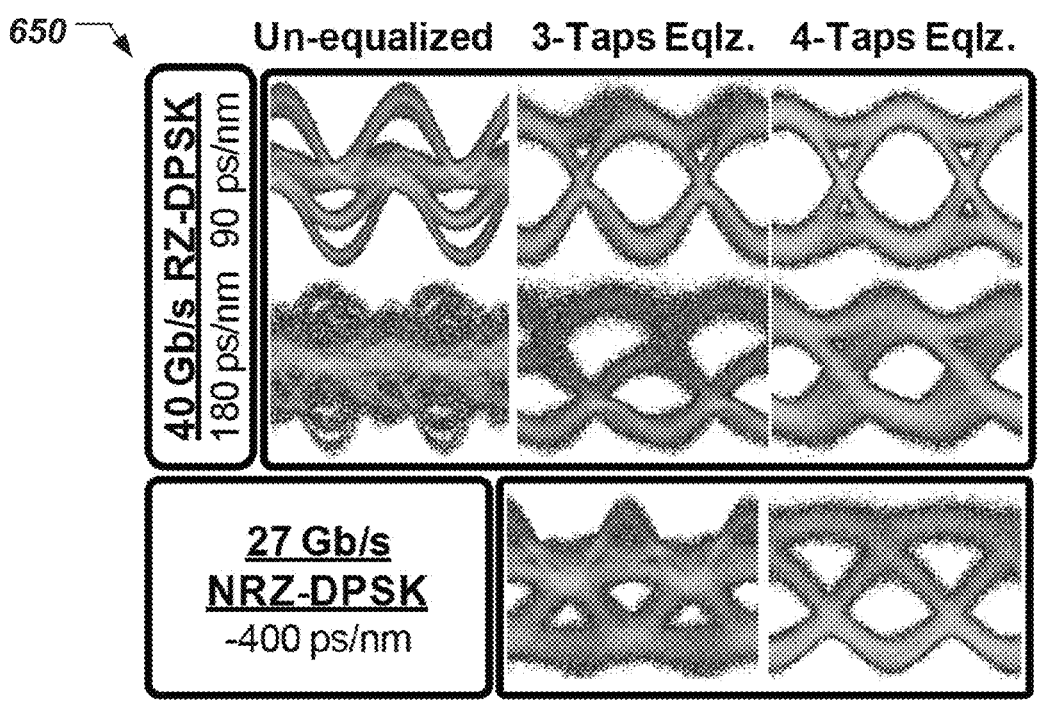
FIG. 6B shows eye diagrams.

BER measurements are performed on the equalized signal and the input signal. The receiver sensitivity penalties (at a BER of $10^{-9}$) for 3-tap and 4-tap equalization for 40-Gbit/s RZ-DPSK and three tap equalization for 27-Gbit/s NRZ-DPSK signal are shown in a chart 600 and eye diagrams 650 in FIGS. 6A and 6B. We have observed that 4-tap equalization results in improvements with respect to the 3-tap equalization. For a 3 dB receiver sensitivity penalty, the B2B signal has a tolerance of ~50 ps/nm of dispersion, while it can be improved to ~110 ps/nm with 3-taps, and to ~160 ps/nm with 4-taps. The double wavelength conversion (0 ps/nm dispersion, single-tap operation) has an average penalty of ~1.5 dB.

Figure 7A:
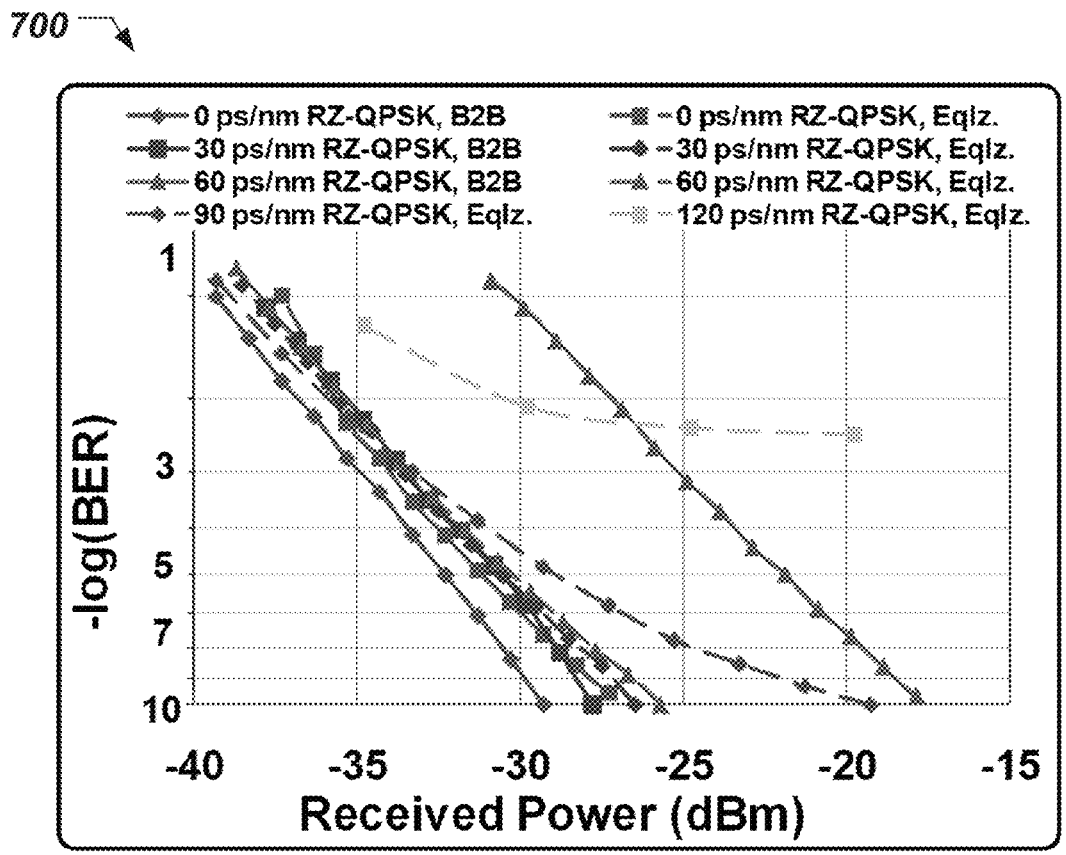
FIG. 7A shows BER measurements for the 80 Gbit/s differential-quadrature phase-shift-keying (DQPSK) signals.
Figure 7B:
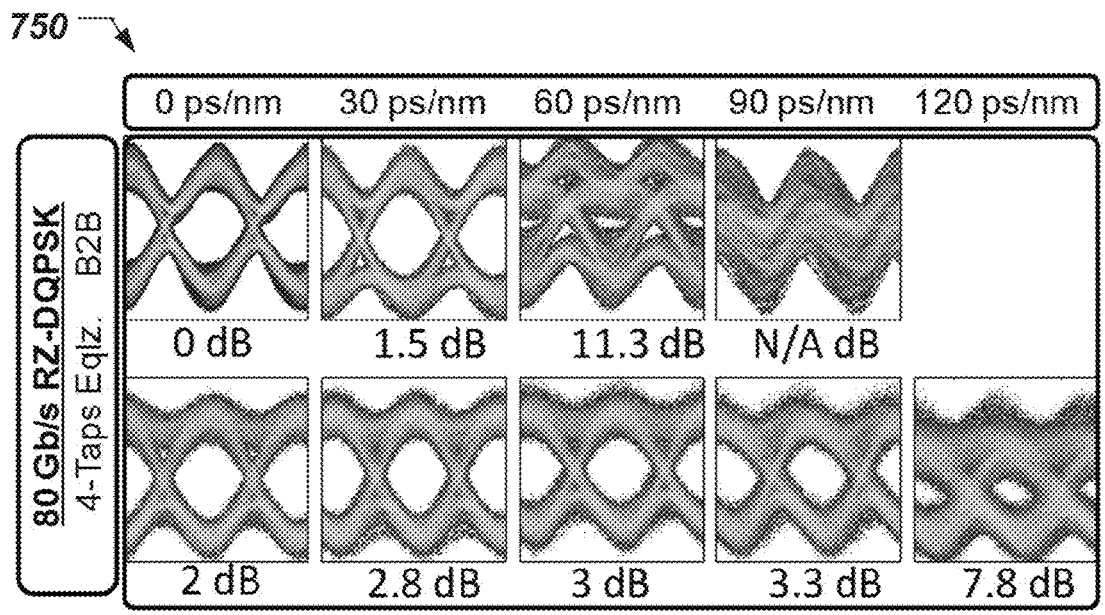
FIG. 7B shows back-to-back and equalized eye diagrams.
Figure 8A:
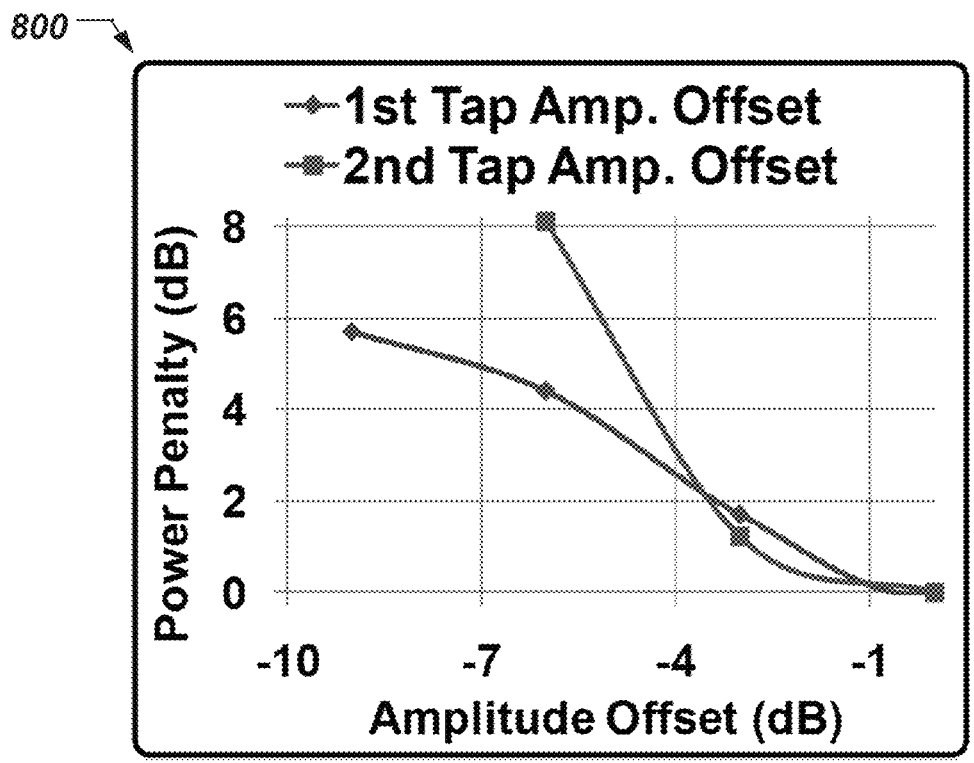
FIGS. 8A and 8B show equalizer sensitivity to tap variations for 3-tap −120 ps/nm equalization at $10^{-9}$ BER.
Figure 8B:
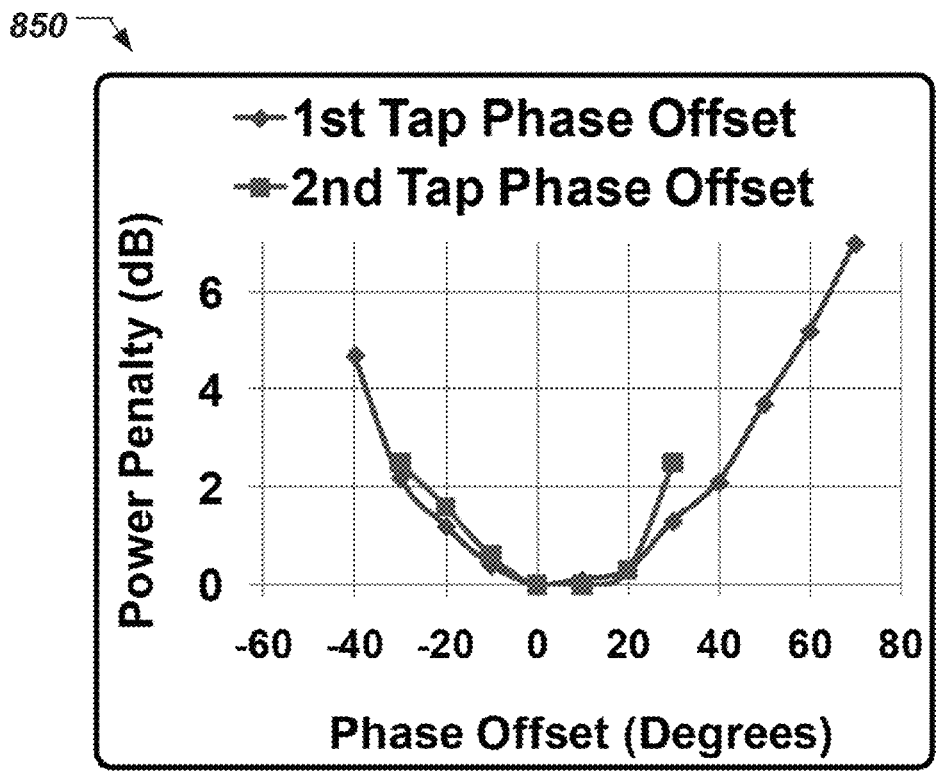

As shown in a chart 700 and eye diagrams 750 in FIGS. 7A and 7B, the equalization of dispersion on an 80-Gbit/s RZ-DQPSK is also demonstrated using four taps with $T_s/2$ spacing. At 3 dB power penalty, the improvement is from ~40 ps/nm to ~70 ps/nm and for dispersions as large as 120 ps/nm, BER rates of $10^{-9}$ is achievable with 7.8 dB penalty. A chart 800 for amplitude offset and a chart 850 for phase offset in FIGS. 8A and 8B show the sensitivity of the 3-tap −120 ps/ran equalizer to the variations of the CW pumps powers and tap phases. It can be observed that the penalties are negligible for <20° phase change and <2 dB decrease in multicasting pump powers.

The above description addresses implementations involving 80-Gbit/s DQPSK Optical Tapped-Delay-Line Equalization using Finely Tunable Delays, Phases and Amplitudes. Other implementations can include: (1) a Demonstration of 28-40-Gbaud, OOK/BPSK/QPSK Data-Transparent Optical Correlation with Control/Tunability over Time Delays, Phases and Number of Taps, and (2) a Demonstration of Baud-Rate-Variable and Channel-Spacing-Tunable Demultiplexing of 10-40-Gbaud OFDM Subcarriers using a Multi-Tap Optical DFT, each of which are described in Application Ser. No. 61/606,102.

While this specification contains many specific implementation details, these should not be construed as limitations on the scope of the invention or of what my be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, white operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Thus, particular embodiments of the subject matter have been described. Other embodiments are within the scope of the following claims. For example, it will be appreciated that variations are possible, including potentially increasing the number of taps using modulated pumps.

What is claimed is:

1. A device comprising:
    an optical tapped delay line (TDL) including
        a wavelength conversion element;
        a phase filter coupled with an output of the wavelength conversion element;
        a dispersive element, coupled with an output of the phase filter, to impose a relative delay to an optical signal; and
    an optical multiplexer coupled with an output of the dispersive element.

2. The device of claim 1, where the wavelength conversion element uses second order and third order nonlinear susceptibility.

3. The device of claim 1, where the optical multiplexer comprises a periodically polled lithium niobate (PPLN) waveguide to combine signals in a phase coherent manner.

4. The device of claim 3, where the phase filter comprises a spatial light modulator (SLM) coupled between the wavelength conversion element and the dispersive element.

5. The device of claim 4, where the wavelength conversion element comprises another periodically polled lithium niobate (PPLN) waveguide to effect cascaded sum frequency generation followed by difference frequency generation (cSFG-DFG).

6. The device of claim 1, where delays effected by the optical TDL are tunable.

7. The device of claim 1, where the wavelength conversion element comprises a nonlinear optical element including integrated waveguides exploiting nonlinear materials.

8. The device of claim 1, where the optical TDL works for phase, intensity and polarization based modulation formats.

9. The device of claim 1, where the optical TDL includes a conversion stage of a conversion/dispersion delay line, the conversion stage comprising multiple pumps.

10. The device of claim 9, where the optical TDL includes a phase coherent multiplexing stage.

11. The device of claim 9, where the optical TDL includes taps, and weights of the optical TDL taps are complex numbers, comprising amplitude and phase.

12. A device comprising:
    an optical tapped delay line (TDL) including a wavelength conversion element and a dispersive element coupled with the wavelength conversion element to impose a relative delay to an optical signal;
    dummy pumps coupled with an input of the wavelength conversion element to control a number of taps, tap delays, and tap weights for multicast copies of the optical signal corresponding to the dummy pumps;
    a mechanism to control relative phases of the multicast copies with their corresponding dummy pumps before multiplexing to control tap-phases to realize complex valued weights;
    a multiplexing stage that uses the dummy pumps as sum frequency generation (SFG) pumps to mix with their corresponding multicast copies of the optical signal in the multiplexing stage; and
    one or more laser pumps, in addition to the dummy pumps, to effect phase coherent multiplexing via a difference frequency generation (DFG) process to generate multiplexed output comprising a signal equalized according to the tap weights.

13. The device of claim 12, wherein the mechanism comprises an in line phase/amplitude programmable filter.

14. The device of claim 12, where the wavelength conversion element comprises a nonlinear optical element including integrated waveguides exploiting nonlinear materials.

15. The device of claim 12, where the optical TDL works for phase, intensity and polarization based modulation formats.

16. A device comprising:
    an optical tapped delay line (TDL) including
        a wavelength conversion element; and
        a dispersive element, coupled with the wavelength conversion element, to impose a relative delay to an optical signal;

where the optical TDL includes a conversion stage of a conversion/dispersion delay line, the conversion stage comprising multiple pumps;

where the optical TDL includes taps, and weights of the optical TDL taps are complex numbers, comprising amplitude and phase; and the device comprising a spatial light modulator (SLM), where phases are applied in the SLM.

17. The device of claim 16, where phases of the pumps are controlled by tuning of pump wavelengths.

18. The device of claim 16, where the wavelength conversion element uses second order and third order nonlinear susceptibility.

19. The device of claim 16, where the wavelength conversion element comprises a nonlinear optical element including integrated waveguides exploiting nonlinear materials.

20. The device of claim 16, where the optical TDL works for phase, intensity and polarization based modulation formats.

* * * * *